(12) United States Patent
Genevrier et al.

(10) Patent No.: US 12,487,088 B2
(45) Date of Patent: Dec. 2, 2025

(54) AIRBORNE MEASUREMENT SYSTEM COMPRISING A SPAD CAMERA

(71) Applicant: THALES, Meudon (FR)

(72) Inventors: Gilles Genevrier, Valence (FR); Warody Lombardi, Valence (FR); Sébastien Legoll, Valence (FR)

(73) Assignee: THALES, Meudon (FR)

( * ) Notice: Subject to any disclaimer, the term of this patent is extended or adjusted under 35 U.S.C. 154(b) by 18 days.

(21) Appl. No.: 18/719,776

(22) PCT Filed: Oct. 28, 2022

(86) PCT No.: PCT/EP2022/080193
§ 371 (c)(1),
(2) Date: Jul. 2, 2024

(87) PCT Pub. No.: WO2023/110206
PCT Pub. Date: Jun. 22, 2023

(65) Prior Publication Data
US 2025/0044093 A1    Feb. 6, 2025

(30) Foreign Application Priority Data
Dec. 16, 2021 (FR) ...................................... 2113637

(51) Int. Cl.
*G01C 21/00* (2006.01)
*G06T 7/521* (2017.01)
*G06T 7/55* (2017.01)

(52) U.S. Cl.
CPC ............ *G01C 21/005* (2013.01); *G06T 7/521* (2017.01); *G06T 7/55* (2017.01); *G06T 2207/10028* (2013.01); *G06T 2207/10032* (2013.01)

(58) Field of Classification Search
None
See application file for complete search history.

(56) References Cited

U.S. PATENT DOCUMENTS

| 2016/0041266 A1* | 2/2016 | Smits ................ G01S 17/66 356/5.01 |
| 2019/0064323 A1 | 2/2019 | Mayer et al. |

(Continued)

FOREIGN PATENT DOCUMENTS

FR            3 091 777 A1       7/2020

OTHER PUBLICATIONS

Stereo Vision) [retrieved on FEb. 7, 2025]. Retrieved from the Internet: < URL: https://www.mathworks.com/discovery/stereo-vision.html.

(Continued)

*Primary Examiner* — Xiaolan Xu
(74) *Attorney, Agent, or Firm* — BakerHostetler

(57) ABSTRACT

An airborne measurement system borne by an aircraft, and comprising a plurality of conventional navigational-aid sensors generating data referred to as conventional data, at least one SPAD camera comprising a single-photon avalanche diode matrix-array detector and generating SPAD data comprising a first image and a second image of a scene to be observed, the system comprising a processing unit connected to the conventional sensors and to the at least one SPAD camera, the processing unit being adapted to: choose, in accordance with a predetermined criterion and on the basis of the conventional data and/or of the SPAD data, a use of the conventional data which is referred to as the conventional mode, or a use of the SPAD data, and possibly comprising conventional data, which is referred to as the SPAD mode, and for the conventional mode, generate measurement information referred to as conventional information on the basis of conventional data, for the SPAD mode: determine, on the basis of the first image and of the second image, an error band for the measurement of the horizontal position of the aircraft, called the protection radius, generate (Continued)

measurement information referred to as reinforced information on the basis of at least SPAD data.

15 Claims, 2 Drawing Sheets

(56) References Cited

U.S. PATENT DOCUMENTS

| | | | |
|---|---|---|---|
| 2020/0142038 A1* | 5/2020 | Han | G05D 1/0248 |
| 2021/0018611 A1* | 1/2021 | Chhabra | G01S 15/86 |
| 2021/0278257 A1* | 9/2021 | Dharia | G01S 17/89 |
| 2022/0390559 A1* | 12/2022 | McGuire | G01S 7/4816 |
| 2023/0108592 A1* | 4/2023 | McGuire | H10F 30/225 |
| | | | 356/4.01 |
| 2024/0320810 A1* | 9/2024 | He | G06T 3/4007 |

OTHER PUBLICATIONS

Uijt, et al., "Assured UAS Navigation with Airborne Laser Range Scanners for Various Phases of Flight", 2018 IEEE/AIAA 37th Digital Avionics Systems Conference (DASC), 2018.

Soan, et al., "Comparative assessment of different active imaging technologies for imaging through obscurants", Electro-Optical Remote Sensing XII, SPIE vol. 10796, 2018.

* cited by examiner

AIRBORNE MEASUREMENT SYSTEM COMPRISING A SPAD CAMERA

CROSS-REFERENCE TO RELATED APPLICATIONS

This application is a National Stage of International patent application PCT/EP2022/080193, filed on Oct. 28, 2022, which claims priority to foreign French patent application No. FR 2113637, filed on Dec. 16, 2021, the disclosures of which are incorporated by reference in their entireties.

FIELD OF THE INVENTION

The present invention relates to the field of aeronautics and more specifically to the field of airborne measurement systems for aiding with navigation.

BACKGROUND

Airborne measurement systems borne by an aircraft comprise a plurality of sensors which supply data to at least one processing unit. On the basis of these data, the processing unit generates information delivered to the pilot of the aircraft or to a flight computer (for example, an autopilot). This information relates in general to fundamental flight parameters of the aircraft, such as position, speed with respect to the terrestrial reference frame, height from the ground, calibrated airspeed (CAS), true airspeed (TAS), flight altitude, distance from a terrain, etc. The various conventional sensors used are too numerous to all be enumerated, but they are typically chosen from the following list: a weather sensor, a location sensor such as a GNSS (global navigation satellite system) receiver, for example a GPS receiver, or a VOR (VHF omnidirectional range) sensor, or indeed a DME (distance measuring equipment) sensor. The measurement system may also comprise anemobarometric sensors such as pitot probes or lidars for generating data, for example lift via the angle of incidence of the airplane, CAS, TAS, flight altitude, etc. The measurement systems may be enriched by on-board databases such as databases relating to approaches.

In degraded visibility conditions, navigational-aid measurement systems of the prior art use the location data supplied by the (GPS, VOR, DME, etc.) location sensors and the radio-altimetric data and in some cases cameras are used in addition, notably in enhanced vision systems (EVSs) such as synthetic vision systems (SVSs) or enhanced flight vision systems (EFVSs). These cameras have limited sensitivities and are not usable in degraded flight conditions such as in the presence of fog, of snowfall, of heavy rain, or indeed of a dust cloud such as, for example, when a helicopter lands.

Existing measurement systems require:
  either aircraft to be highly equipped in order to navigate in degraded visibility conditions, notably during take-off, approach and landing phases referred to as IFRs (instrument flight rules) and rescue phases,
  or aids, notably for all-weather landings (instrument landing system), to be present on the ground,
  or operations to be limited to low-level (category I as defined in Annex 10 of the Chicago Convention) ILS (instrument landing system) approach categories.

Existing vision systems make only marginal improvements possible but without real operational gain such as reducing the decision altitude on the approach (the decision height is the height above the ground at which the pilot must have enough visual references to land otherwise they are required to reopen the throttle and abandon the approach) lowering, for example, the decision height for a given approach level.

SUMMARY OF THE INVENTION

The invention aims to increase the capacities linked to the use of vision systems of the prior art. For this purpose, one subject of the invention is an airborne measurement system comprising at least one SPAD (single-photon avalanche diode) camera, that is to say comprising a single-photon avalanche diode matrix-array detector. In comparison with traditional CMOS or CCD cameras, SPAD cameras notably have a markedly higher detection sensitivity and frame rate and a markedly finer time resolution. This makes them perform better in specific flight phases or degraded visibility conditions.

One subject of the invention is an airborne measurement system borne by an aircraft, and comprising a plurality of conventional navigational-aid sensors generating data referred to as conventional data, at least one SPAD camera comprising a single-photon avalanche diode matrix-array detector and generating SPAD data comprising a first image and a second image of a scene to be observed, said system comprising a processing unit connected to the conventional sensors and to said at least one SPAD camera, the processing unit being adapted to:
  choose, in accordance with a predetermined criterion and on the basis of the conventional data and/or of the SPAD data, a use of the conventional data which is referred to as the conventional mode, or a use of the SPAD data, and possibly comprising conventional data, which is referred to as the SPAD mode, and
  for the conventional mode, generate measurement information referred to as conventional information on the basis of conventional data,
  for the SPAD mode:
  determine, on the basis of the first image and of the second image, an error band for the measurement of the horizontal position of the aircraft, called the protection radius,
  generate measurement information referred to as reinforced information on the basis of at least SPAD data.

According to one embodiment, the device comprises a single SPAD camera. Preferably, in this embodiment, the first image is acquired at a first instant and the second image being acquired at a second instant, the protection radius being determined on the basis of a value of the movement of the aircraft between the first instant and the second instant. Preferably again, the first image is acquired at a first instant and the second image being acquired at a second instant, the protection radius being determined on the basis of a value of the movement of the aircraft between the first instant and the second instant. Preferably, determining the movement value is a rotation value and/or a translation value determined by comparing points of interest between the first image and the second image.

According to one embodiment, the device comprises comprising a laser emitting laser radiation, and wherein the SPAD camera is adapted to detect laser radiation reflected by the scene, the processing unit is adapted to then determine a distance $D_o$ between a point in the scene and the aircraft on the basis of the reflected radiation, said reinforced information then comprising said distance $D_o$. Preferably, the processing unit is adapted to compute a 3D depth image of the scene on the basis of a plurality of distances $D_{o,i}$ between points i in the scene and the aircraft, each distance $D_{o,i}$ being determined by the processing unit on the basis of the radiation detected a pixel of the SPAD camera which is different from the others, said reinforced information then comprising said 3D depth image of the scene.

According to one embodiment, the device comprises a first SPAD camera and a second SPAD camera. The first SPAD camera and the second SPAD camera are synchronized, the first image and the second image being acquired simultaneously by the first SPAD camera and by the second SPAD camera, respectively. Preferably, in this embodiment, the processing unit is adapted to compute a 3D depth image of the scene of said scene on the basis of the first image and of the second image, said reinforced information then comprising said 3D depth image of the scene.

According to one embodiment, the conventional sensors comprise: a weather radar and/or a system for receiving weather records via a ground/air or air air/satellite link, the choice of the conventional or SPAD mode being made on the basis of the conventional data supplied by the weather radar and/or the weather record system, and possibly by a GPS receiver.

According to one embodiment, said at least one SPAD camera detects, at reception times $T_{rec}$ and with an exposure time $T_{exp}$, light signals transmitted, at predefined transmission times $T_{em}$, by a transmitter station contained in the scene to be observed, the processing unit being configured to receive information on the transmission times and to generate reinforced information which is a distance from the aircraft to said scene for all the reception times $T_{rec}$, which is determined on the basis of the detected light signals and of said information on the transmission times $T_{em}$. Preferably, the transmission times are accurate to within 0.01 µs or less. Preferably, wherein the conventional sensors comprise a GPS receiver supplying GPS data which are used by the processing unit to remove an ambiguity in the distance between the aircraft and said scene.

According to one embodiment, the conventional data are chosen from the following list: location data of GPS, IRS, VOR or DME type, for example; weather data; anemo-barometric data; radio-altimetric data.

Another subject of the invention is a method for avionic measurement by an airborne system comprising borne by an aircraft, and comprising a plurality of conventional navigational-aid sensors generating data referred to as conventional data, at least one SPAD camera comprising a single-photon avalanche diode matrix-array detector and generating SPAD data comprising a first image and a second image of a scene to be observed, said method comprising:
 choosing, in accordance with a predetermined criterion and on the basis of the conventional data and/or of the SPAD data, a use of the conventional data which is referred to as the conventional mode, or a use of the SPAD data, and possibly comprising conventional data, which is referred to as the SPAD mode, and
 for the conventional mode, generate measurement information referred to as conventional information on the basis of conventional data,
 for the SPAD mode:
 determine, on the basis of the first image and of the second image, an error band for the measurement of the horizontal position of the aircraft, called the protection radius,
 generating measurement information referred to as reinforced information (IR) on the basis of at least SPAD data.

BRIEF DESCRIPTION OF THE DRAWINGS

Other features, details and advantages of the invention will become apparent on reading the description given with reference to the appended drawings, which are given by way of example and which show, respectively.

In the figures, unless otherwise indicated, the elements are not to scale.

DETAILED DESCRIPTION

Figure 1:
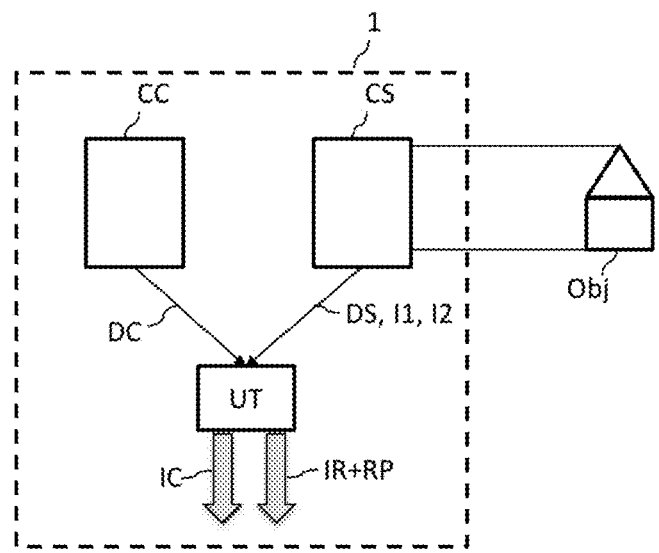
FIG. 1 a schematic view of a measurement system according to the invention.

FIG. 1 illustrates a schematic view of an airborne measurement system 1 according to the invention, borne by an aircraft for aiding with the navigation of the aircraft. Like measurement systems of the prior art, the measurement system 1 comprises a plurality of conventional navigational-aid sensors CC generating data referred to as conventional data DC. By way of non-limiting example, the conventional data DC are chosen from the following list: location data; weather data; anemo-barometric data; data on the height from the ground (radio altimetry). The location data are, for example, GPS data, inertial reference system (IRS) data, VOR data or DME data.

In addition, in order to make the system perform better in specific flight phases or in some flight conditions where the conventional sensors CC may be suboptimal, the system 1 comprises at least one SPAD camera labeled CS. The one or more SPAD cameras comprise a single-photon avalanche diode matrix-array detector.

SPAD cameras are elements known to a person skilled in the art and are, for example, described in the article "Comparative assessment of different active imaging technologies for imaging through obscurants" Proc. of SPIE Vol. 10796 107960C-1. For detection, each pixel of conventional CMOS or CCD sensors measures the amount of light which reaches it in a given time, while the pixels of SPAD sensors measure each photon which reaches the pixel. Each photon which enters the pixel is immediately converted into electric charge, and the electrons which result therefrom are multiplied by an avalanche ionization phenomenon until they form a large signal charge which may be extracted. CMOS sensors detect light in the form of electrical signals by measuring the volume of light which accumulates in a pixel during the acquisition time, which makes it possible for electronic noise to penetrate the pixel with the photons, thus contaminating the information received. SPAD sensors, for their part, count the individual photons digitally, which reduces the electronic noise in the images. SPAD cameras have a sensitivity which is incommensurable with conventional CCD or CMOS cameras (at least 1000 times more sensitive), an extremely high frame rate (10 000 or even 200 000 images per second), a very fine time resolution (a few ns to a few ps), and a very high signal-to-noise ratio because of the natively digital technology of the matrix-array sensor.

Figure 2:
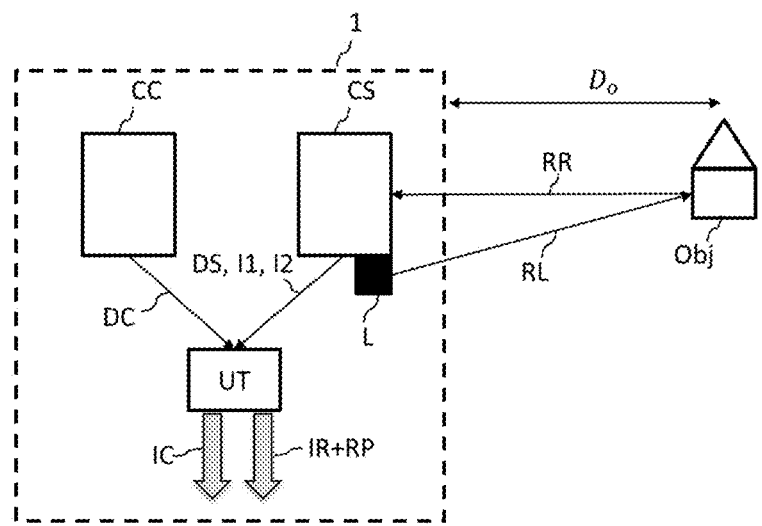
FIG. 2 a schematic view of one embodiment of the first variant of the invention.

According to one embodiment of the invention, the system comprises a single SPAD camera (see, for example, FIG. 2). Alternatively, according to another embodiment, the system comprises at least two SPAD cameras (see, for example, FIG. 3). In the rest of the description of FIG. 1, by way of non-limiting example and in order to simplify comprehension, the system 1 of FIG. 1 comprising a single SPAD camera will be described, but the invention applies equally well to more than one SPAD camera.

The SPAD CS continuously generates SPAD data, labeled DS, comprising a first image I1 and a second image I2 of a scene to be observed Obj. The scene Obj is typically a portion of the terrain flown over by the aircraft. The SPAD data are 2D images or are event-based data, that is to say information comprising the position of the illuminated pixels and the intensity value of the pixel. Using event-based detection makes it possible to reduce the stream of data DS to be processed by the system.

In order to process these data DC and DS, the system 1 comprises a processing unit UT connected to the conventional sensors and to the SPAD camera. This processing unit UT is adapted to choose, in accordance with a predetermined criterion and on the basis of the conventional data and/or of the SPAD data, a use of the conventional data which is referred to as the conventional mode, or a use of the SPAD data, which is referred to as the SPAD mode. In the SPAD mode, the processing unit optionally uses the conventional data DC, in addition to the data DS.

The unit UT therefore makes it possible for the system 1 to switch from a conventional mode, in which the data DC from the conventional sensors CC are the most relevant, to a SPAD mode, in which the data DS from the SPAD camera are of particular interest, for example because the sensors CC are liable to be dysfunctional in the current surroundings of the aircraft or because the SPAD cameras perform better for the specific flight phase of the aircraft.

The predetermined criterion on which the choice of the processing unit is based is, for example, a weather criterion determined in accordance with the optimal use range of some of the conventional sensors CC, or a location criterion for specific approaches such as oil platforms. In accordance with the criterion, the choice of the mode is, for its part, made by the processing unit, taking account of the data DC and/or of the data DS, for example on the basis of weather records for a weather criterion or of the location data (e.g. GPS data) for a location criterion.

According to one embodiment, one of the predetermined criteria is based on a range of temperatures or on a range of densities of particles in the air in the event of snow, rain, frost or indeed fog, in which the conventional sensors and some anemo-barometric probes have degraded performance or malfunctions.

For example, one criterion is associated with the visibility of the images produced by the conventional image sensors. That is to say that the criterion corresponds to a limit parameter on the basis of which the images produced by the conventional image sensors ("conventional images") are considered to be unusable. According to one embodiment, this criterion corresponds to a minimum visibility threshold for the conventional images, the visibility threshold being, for example, a minimum contrast such as that defined by the International Commission on Illumination, or 5% ("smallest contrast, produced at the eye of an observer by a given object, which renders the object perceptible against a given background"). In this embodiment, the choice of the mode by the processing unit UT is made on the basis of processing the conventional images by determining the contrast in these images. That is to say that the processing unit selects the SPAD mode if the contrast in the conventional images is less than 5%.

For example, one criterion is associated with extreme frosty conditions which correspond typically to a particle density which is greater than an upper-limit particle density $n_{lg}=10$ cm$^{-3}$ for particles with a radius of between 1 μm and 10 μm and in which pitot probes are liable to experience faults. Thus, the choice of the mode by the processing unit UT is made on the basis of weather data DC delivered by the weather radar. That is to say that the processing unit selects the SPAD mode if the weather data supplied to the unit UT indicate that the particle density is greater than $n_{lg}=10$ cm$^{-3}$ in the immediate surroundings of the aircraft.

More generally, according to a preferred embodiment, the conventional sensors comprise: a weather radar and/or a system for receiving weather records via a ground/air or air air/satellite link and the choice between the conventional mode and the SPAD mode is made on the basis of the conventional data supplied by the weather radar and/or the weather record system, and possibly by a GPS receiver of the aircraft. In this embodiment, the weather information specifies whether the aircraft is in optimal or degraded flight condition for some of the conventional sensors. The optional GPS receiver may be used to situate the aircraft accurately with respect to the weather information.

According to one embodiment, one of the predetermined criteria is associated with a phase of approaching a runway in which the sensitivity of the SPAD cameras makes it possible to easily detect the lighted marking of the runway or on the approach to the runway (see FIG. 4, for example) or indeed the lighted marking of high-voltage lines or of high points such as wind turbines, buildings, etc.

In the conventional mode, the processing unit UT is configured to generate measurement information referred to as conventional information IC on the basis of conventional data. In this conventional mode, the SPAD data are not desirable or do not contribute any additional relevant information. This measurement information IC is, for example, measurements of distance with respect to an object in the scene Obj, a pressure altitude or a real altitude, a CAS or TAS or indeed any other flight parameter known to a person skilled in the art.

In the SPAD mode, the processing unit UT is configured to generate measurement information referred to as reinforced information IR on the basis of at least the SPAD data. In the SPAD mode, because of the surroundings of the aircraft or of the flight phase, the SPAD data contribute additional information with respect to the data DC. This additional information depends on the specific use of the SPAD data. Preferably, in the SPAD mode, the processing unit UT supplies measurement information based on the data DC but enriched by the data DS, that is to say that the SPAD data supplement or correct those produced by the conventional sensors. For example, the processing unit generates CAS and/or TAS, or indeed angle of incidence, information on the basis of the SPAD data, for example by measuring the relative movement of points of interest between at least two images, and, by comparison with the same parameters determined with data DC, the processing unit does or does not invalidate some of the parameters determined with data DC.

In addition, in the SPAD mode, the processing unit UT is configured to determine, on the basis of the first image I1 and of the second image I2, an error band for the measurement of the horizontal and/or vertical position of the aircraft, called the protection radius RP. That is to say that the system 1 is adapted to specify the integrity of the measurements of the horizontal and/or vertical position which are supplied in the SPAD mode and computed via the data DS.

In the field of the invention, integrity represents the degree of confidence which may be placed in the accuracy of the information supplied by a navigation system. The integrity of a navigation system is generally measured by defining alert limits. It is then said that there is a positioning fault when the difference between the real position of the body and that supplied by the navigation system exceeds the defined alert limits. The alert limits designate the maximum position errors which the system may commit while complying with integrity, and therefore fault, constraints. They are called HAL (horizontal alert limit) or HPL (horizontal protection level) and VAL (vertical alert limit) or VPL (vertical protection level), respectively. As far as the horizontal and/or vertical position error is concerned, "protection radius" may also be spoken of. For RNP (required navigation performance) approaches or navigation, the integrity of the navigation system is obligatory by definition. RNP navigation is defined in the standard "RTCA DO 236 MINIMUM AVIATION SYSTEM PERFORMANCE STANDARDS: REQUIRED NAVIGATION PERFORMANCE FOR AREA NAVIGATION" and by "ICAO Doc 9613 Performance-based Navigation (PBN) Manual" (see § 1.2.4.1 or indeed § 2.3.4).

The concept of integrity for aeronautics is, for its part, defined by the standard RTCA, Inc., Minimum Operational Performance Standards for Global Positioning System/Wide Area Augmentation System Airborne Equipment, RTCA DO-229C, Nov. 28, 2001.

Measuring integrity on the basis of two images supplied by the same image sensor is described in the patent application FR 3 091 777, notably in sections § 261-§ 264.

In the invention, using SPAD sensors makes it possible to ensure the integrity of the system in a context where the other navigation systems based on conventional image sensors cannot guarantee operation.

The system of the invention therefore makes it possible to supply conventional measurements in normal flight conditions and reinforced measurements combined with integrity information in specific conditions. The system thus formed therefore constitutes a navigational-aid system which performs better and is more versatile than those of the prior art. It must be noted that the SPAD data and the conventional data associated with conventional image sensors are particularly complementary. Specifically, the use range of the SPAD data corresponds to a range where the conventional images are unusable either through a lack of luminosity (flight at night) or through a lack of contrast (contrast of less than 5% and flight in fog in the day) or through a lack of luminosity and of contrast (flight at night in fog).

According to one embodiment, the choice between the SPAD mode and conventional mode may also be made by a user of the aircraft, such as the pilot or a member of the crew, for example.

According to one embodiment, the measurement information IR or IC is transmitted to the pilot via a cockpit display system in order to make it easier for the pilot to take a decision. In addition, the information IR or IC is transmitted to a system for computing the flight orders such as an autopilot or a flight control system in order to make it possible to adjust the flight parameters of the aircraft or not.

According to a first variant of the invention, the system 1 comprises a single SPAD camera. In this first variant of the invention, the first image is acquired at a first instant t1 and the second image is acquired at a second instant t2. As is detailed in the application FR 3 091 777, in the first variant of the invention, the protection radius is determined on the basis of a value of the movement of the aircraft between the first instant t1 and the second instant t2. For reasons of conciseness, the detail of computing the protection radius will not be revisited in the present application, since it is explained in the application FR 3 091 777. Preferably, determining the movement value is a rotation value and/or a translation value determined by comparing points of interest between the first image I1 and the second image I2. Thus, it is possible to determine the protection radius of the system 1 by means of data DS originating only from the SPAD camera.

Alternatively, the movement value is determined by other means, for example by means of GPS data.

FIG. 2 illustrates one embodiment of the first variant of the invention adapted to carry out a lidar measurement of the distance $D_o$ between a point in the observed scene and the aircraft. For this purpose, the system comprising a laser L emitting laser radiation RL. In addition, the SPAD camera is adapted to detect laser radiation RR reflected by the scene and the processing unit is adapted to determine the distance $D_o$ so that the reinforced measurement comprises the distance $D_o$.

According to one embodiment, the source L is adapted to emit pulsed laser radiation and the processing unit determines the distance $D_o$ on the basis of a time of flight $\tau$ of the laser pulses, $D_o = c.\tau/2$, with c being the speed of light in air.

Alternatively, according to another embodiment, the source L is adapted to emit FM-CW (frequency-modulated continuous-wave) laser radiation. In this embodiment, the optical frequency of the source is modulated, for example with a periodic linear ramp. Furthermore, the light coming from the source is divided into two paths: some (object path) of the radiation RL is projected on a point in the scene where it is backscattered, partially in the direction of the SPAD camera (radiation RR). The rest (reference path) of the radiation RL is sent to the SPAD camera without passing through the scene. The two paths interfere on the SPAD camera. The interference produces beats the frequency of which is proportional to the delay between the two paths, and therefore to the distance. More specifically, for a linear ramp, the frequency of the oscillations is $$f_R = \frac{2BD_o}{cT}$$

with B being the optical frequency excursion or chirp during the duration T of the ramp, and c the speed of light. The distance z is deduced from the number N ($N \approx Tf_R$) of periods measured during the duration T:

$$D_o \approx \frac{Nc}{2B}.$$

The distance resolution is.

$$\delta D_o \approx \frac{c}{2B}.$$

Taking account of the fact that the SPAD camera is a matrix-array detector, in the embodiment of FIG. 2, it is possible to obtain distance information for any pixel of the SPAD camera. It is therefore possible to obtain a 2D map of the distance of the scene, also called a "3D depth image", that is to say a 2D image in which the intensity of a pixel of a point in the scene is proportional to the distance between the aircraft and this point. Thus, preferably, a 3D depth image of the scene is computed by the processing unit UT. More specifically, the processing unit is adapted to compute a 3D depth image of the scene based on the distance $D_{o,i}$ between points i in the scene and the aircraft, each distance $D_{o,i}$ associated with a point i being determined by the processing unit on the basis of the radiation RR detected by a pixel of the SPAD camera which is different from the others. Thus, the reinforced measurement comprises the distances $D_{o,i}$.

Figure 3:
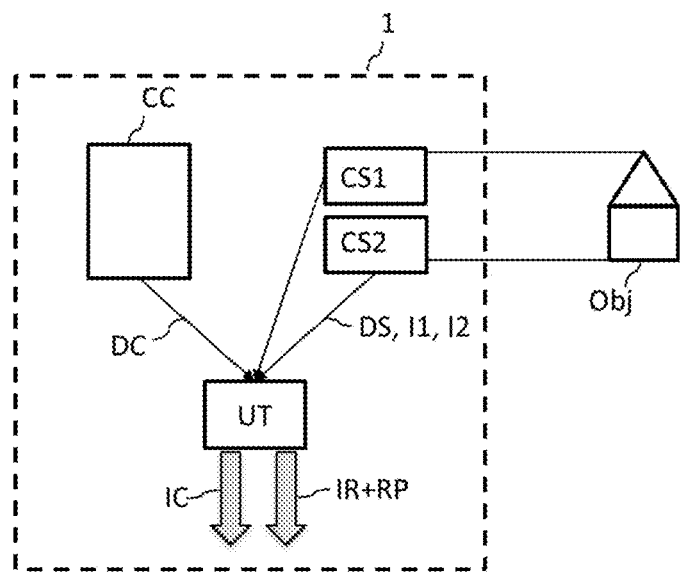
FIG. 3 a schematic view of a second variant of the invention.

According to a second variant of the invention, the system 1 comprises a first SPAD camera, labeled CS1, and a second SPAD camera, labeled CS2. FIG. 3 schematically illustrates this embodiment. Preferably, in the second variant, the first SPAD camera and the second SPAD camera are synchronized so that the first image and the second image are acquired simultaneously by the camera CS1 and by the camera CS2, respectively. This feature makes it possible to compute a 3D depth image of the scene. Also, preferably, the processing unit UT is adapted to compute a 3D depth image of the scene on the basis of the first image and of the second image. The algorithms which make it possible to compute a 3D depth image on the basis of two simultaneously acquired images are well known to a person skilled in the art (see, for example, https://www.mathworks.com/discovery/stereo-vision.html). This embodiment makes it possible to reconstruct the terrain of the scene Obj easily and the reinforced measurement comprises the 3D image. In this embodiment, computing the integrity is simplified with respect to the embodiment of FIG. 2. Specifically, since the images I1 and I2 are acquired simultaneously, it is not necessary to determine the movement of the aircraft between the imaging instants.

Taking account of the very high frame rate of the cameras CS1, CS2, it is possible to average several images obtained by the camera CS1 and by the camera CS2 during an exposure time of a few microseconds, or even a few milliseconds, according to the speed of the aircraft, in order to compute the 3D depth image, without the reconstruction of the 3D image being interfered with by the image distortion caused by the movement of the aircraft. Accumulating several images during an exposure time—which is predetermined in accordance with the speed of the aircraft— makes it possible to increase the signal-to-noise ratio of of the 3D image. Thus, preferably, the 3D image of the scene is reconstructed on the basis of a first averaged image and of a second averaged image, the first averaged image and the second averaged image being generated by the processing unit by averaging a plurality N>2 of images acquired by the cameras CS1 and CS2, respectively, during an exposure time predetermined in accordance with the speed of the aircraft.

Figure 4:
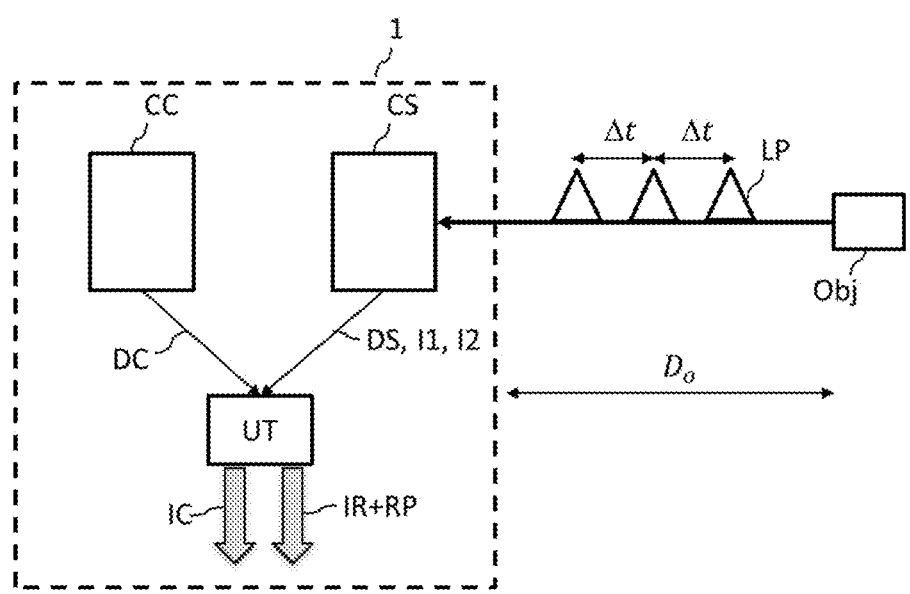
FIG. 4 a schematic view of the system according to one embodiment.

FIG. 4 schematically illustrates of a system according to one embodiment of the invention, which makes it possible to detect the lighted marking of an approach and/or a runway. In the embodiment of FIG. 4, a SPAD camera detects, at reception times $T_{rec}$, light signals LP transmitted by a transmitter station in the scene Obj, at predefined transmission times $T_{em}$. The SPAD camera acquires the images from the light signals LP with an exposure time $T_{exp}$. The transmitter station is, for example, a lighted marker on the ground or on a high point in the scene, such as a wind turbine.

In the embodiment of FIG. 4, the processing unit is configured to receive time information on the transmission times $T_{em}$. That is to say that, on the basis of the aforementioned information, the processing unit is able to determine the transmission times $T_{em}$. The processing unit is, in addition, configured to generate, on the basis of the light signals detected and of the time information, reinforced information which is a distance $D_o$ from the aircraft to the transmitter station in the scene, for each reception time $T_{rec}$, which is determined. More specifically, since the reception date $T_{rec}$ is known, the processing unit UT computes the distance $D_o=c.(T_r-T_{em})$ for each light signal LP.

Since the SPAD camera has an exposure time $T_{exp}$, the maximum distance uncertainty associated with the reception of a light signal will be $\Delta D_{o,exp}=c.T_{exp}$. By way of non-limiting example, for an exposure time $T_{exp}$ less than or equal to 5 ns, the light signals will be received with a maximum distance uncertainty $\Delta D_{o,exp}=c.T_{exp}=1.5$ m. The total distance uncertainty $\Delta D_o$ comprises, in addition, the uncertainty due to the transmission of the light signals, $\Delta D_{o,em}=c. \Delta Tem$, such that $\Delta D_o=\Delta D_{o,exp}+\Delta D_{o,em}$ . . . For a visual detection of the runway (runway visual range or RVR) of 300 m, it is desirable to obtain a total distance uncertainty $\Delta D_o$ less than 6 m. For this purpose, it is necessary for $\Delta Tem$ to be less than or equal to 0.01 µs considering an exposure time $T_{exp}=$ of 5 ns.

According to one embodiment, the time information is a repetition rate $\Delta t=1$ to 100 ms in universal time or in GNSS time. Taking account of this repetition rate, the ambiguity detected in the distance between two pulses LP will be $\Delta D_o=c.\Delta t>300$ km. This ambiguity in distance will be easily resolved, for example, by matching the current position of the aircraft with location data or by using a SPAD camera in distance measurement mode. Thus, the transmission date $T_{em}$ of each light signal will therefore be known with certainty.

It is important to note that the processing unit UT is adapted to the very high rate of data DS which are linked to the extremely high frame rate of the one or more SPAD cameras. This very high rate implies strong constraints on the sizing of the processing units. In order to overcome this problem, according to one embodiment, the processing unit processes the event-based data DS by detecting the elementary changes occurring in the images from the SPAD cameras in order to transmit and process only them.

The invention claimed is:

1. An airborne measurement system borne by an aircraft, and comprising a plurality of conventional navigational-aid sensors (CC) generating data referred to as conventional data (DC), at least one SPAD camera (CS) comprising a single-photon avalanche diode matrix-array detector and generating SPAD data (DS) comprising a first image (I1) and a second image (I2) of a scene to be observed (Obj), said system comprising a processing unit (UT) connected to the conventional sensors and to said at least one SPAD camera, the processing unit being adapted to:
 choose, in accordance with a predetermined criterion and on the basis of the conventional data and/or of the SPAD data, a use of the conventional data which is referred to as the conventional mode, or a use of the SPAD data, and possibly comprising conventional data, which is referred to as the SPAD mode, and
 for the conventional mode, generate measurement information referred to as conventional information (IC) on the basis of conventional data,
 for the SPAD mode:
 determine, on the basis of the first image (I1) and of the second image (I2), an error band for the measurement of the horizontal position of the aircraft, called the protection radius (RP),
 generate measurement information referred to as reinforced information (IR) on the basis of at least SPAD data.

2. The system as claimed in claim 1, comprising a single SPAD camera.

3. The system as claimed in claim 2, wherein the first image is acquired at a first instant (t1) and the second image being acquired at a second instant (t2), the protection radius being determined on the basis of a value of the movement of the aircraft between the first instant (t1) and the second instant (t2).

4. The system as claimed in claim 3, wherein determining the movement value is a rotation value and/or a translation value determined by comparing points of interest between the first image (I1) and the second image (I2).

5. The system as claimed in claim 2, comprising a laser (L) emitting laser radiation (RL), and wherein the SPAD camera is adapted to detect laser radiation (RR) reflected by the scene, the processing unit is adapted to then determine a distance $D_o$ between a point in the scene and the aircraft on the basis of the reflected radiation, said reinforced information then comprising said distance $D_o$.

6. The system as claimed in claim 5, wherein the processing unit is adapted to compute a 3D depth image of the scene on the basis of a plurality of distances $D_{o,i}$ between points i in the scene and the aircraft, each distance $D_{o,i}$ being determined by the processing unit on the basis of the radiation (RR) detected a pixel of the SPAD camera which is different from the others, said reinforced information then comprising said 3D depth image of the scene.

7. The system as claimed in claim 1, comprising a first SPAD camera (CS1) and a second SPAD camera (CS2).

8. The system as claimed in claim 7, wherein the first SPAD camera and the second SPAD camera are synchronized, the first image and the second image being acquired simultaneously by the first SPAD camera and by the second SPAD camera, respectively.

9. The system as claimed in claim 8, wherein the processing unit is adapted to compute a 3D depth image of the scene of said scene on the basis of the first image and of the second image, said reinforced information then comprising said 3D depth image of the scene.

10. The system as claimed in claim 1, wherein the conventional sensors comprise: a weather radar and/or a system for receiving weather records via a ground/air or air air/satellite link, the choice of the conventional or SPAD mode being made on the basis of the conventional data supplied by the weather radar and/or the weather record system, and possibly by a GPS receiver.

11. The system as claimed in claim 1, wherein said at least one SPAD camera detects, at reception times $T_{rec}$ and with an exposure time $T_{exp}$, light signals (LP) transmitted, at predefined transmission times $T_{em}$, by a transmitter station contained in the scene to be observed, the processing unit being configured to receive information on the transmission times and to generate reinforced information which is a distance from the aircraft to said scene for all the reception times $T_{rec}$, which is determined on the basis of the detected light signals and of said information on the transmission times $T_{em}$.

12. The system as claimed in claim 11, wherein said transmission times are accurate to within 0.01 µs or less.

13. The system as claimed in claim 11, wherein the conventional sensors comprise a GPS receiver supplying GPS data which are used by the processing unit to remove an ambiguity in the distance between the aircraft and said scene.

14. The system as claimed in claim 1, wherein the conventional data are chosen from the following list: location data of GPS, IRS, VOR or DME type, for example; weather data; anemo-barometric data; radio-altimetric data.

15. A method for avionic measurement by an airborne system comprising borne by an aircraft, and comprising a plurality of conventional navigational-aid sensors (CC) generating data referred to as conventional data (DC), at least one SPAD camera (CS) comprising a single-photon avalanche diode matrix-array detector and generating SPAD data (DS) comprising a first image (I1) and a second image (I2) of a scene to be observed (Obj), said method comprising:
 choosing, in accordance with a predetermined criterion and on the basis of the conventional data and/or of the SPAD data, a use of the conventional data which is referred to as the conventional mode, or a use of the SPAD data, and possibly comprising conventional data, which is referred to as the SPAD mode, and
 for the conventional mode, generate measurement information referred to as conventional information (IC) on the basis of conventional data,
 for the SPAD mode:
 determine, on the basis of the first image (I1) and of the second image (I2), an error band for the measurement of the horizontal position of the aircraft, called the protection radius (RP),
generate measurement information referred to as reinforced information (IR) on the basis of at least SPAD data.

* * * * *